Figure 1:
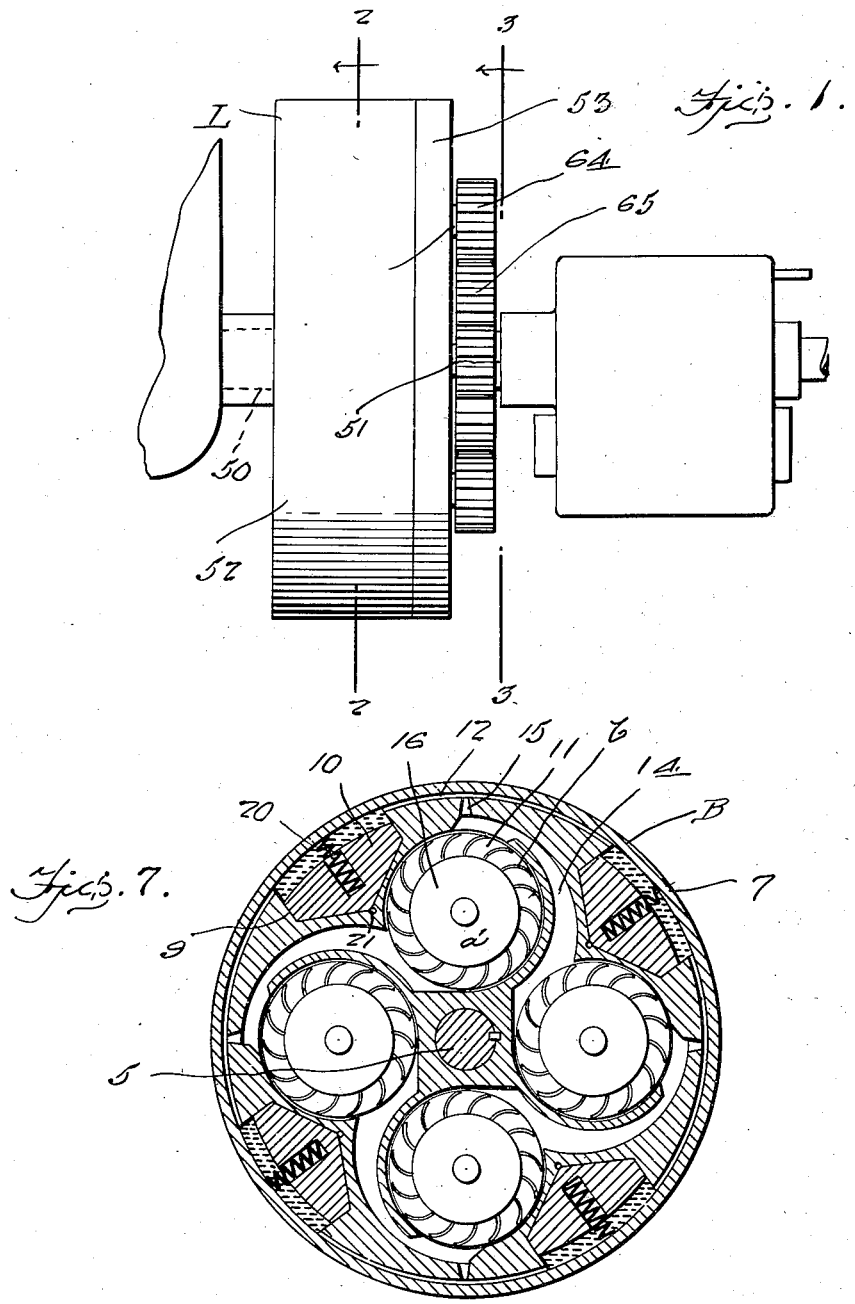

April 17, 1928. 1,666,152
K. J. STRIGL
TRANSMISSION MECHANISM
Filed Feb. 2, 1928 3 Sheets-Sheet 1

April 17, 1928.

K. J. STRIGL

TRANSMISSION MECHANISM

Filed Feb. 2, 1928

3 Sheets-Sheet 2

Inventor
Karl J. Strigl
By Clarence A. O'Brien
Attorney

April 17, 1928.  K. J. STRIGL  1,666,152

TRANSMISSION MECHANISM

Filed Feb. 2, 1928  3 Sheets-Sheet 3

Inventor
Karl J. Strigl
By Clarence A. O'Brien
Attorney

Patented Apr. 17, 1928.

1,666,152

UNITED STATES PATENT OFFICE.

KARL JOSEF STRIGL, OF NEW YORK, N. Y.

TRANSMISSION MECHANISM.

Application filed February 2, 1928. Serial No. 251,355.

The present invention relates to a transmission mechanism and has for its prime object to provide a structure which is automatic in changing the ratio of speed between a drive shaft and a driven shaft for the purpose of eliminating the usual clutch and gear shifting mechanism such as are now in common use on automobiles and the like.

Another very important object of the invention resides in the provision of a transmission mechanism of this nature which is sure to assume a neutral condition under certain predetermined conditions.

Another very important object of the invention resides in the provision of a transmission mechanism of this nature which is quick in its action.

A still further very important object of the invention resides in the provision of a transmission mechanism of this nature which is comparatively simple in its construction, compact in its arrangement of parts, and otherwise thoroughly efficient and reliable.

With the above and numerous other objects in view as will appear as the description proceeds, the invention resides in certain novel features of construction, and in the combination and arrangement of parts as will be hereinafter more fully described and claimed.

Figure 2:
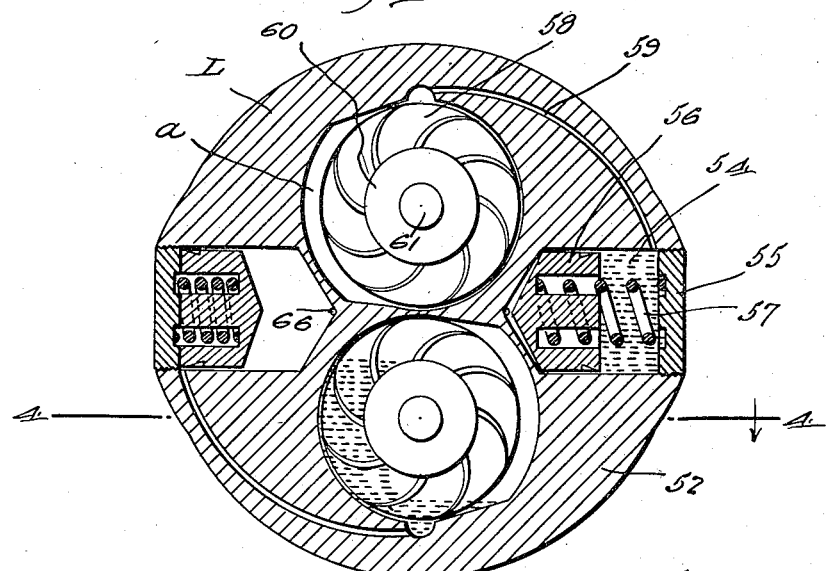
Figure 4:
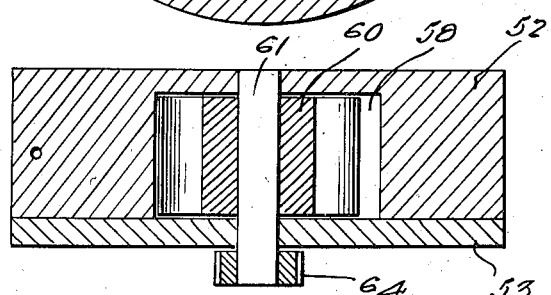
Figure 3:
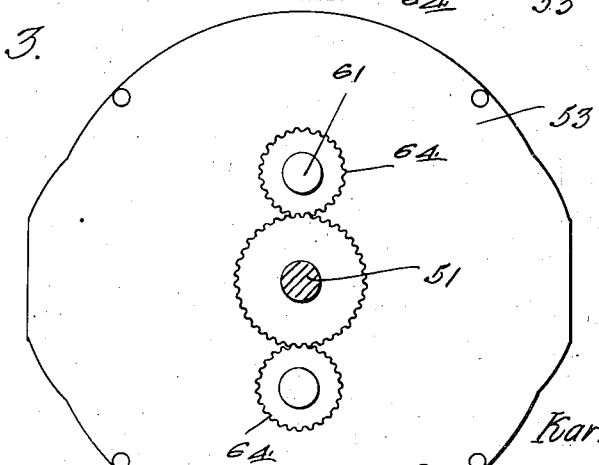
Figure 5:
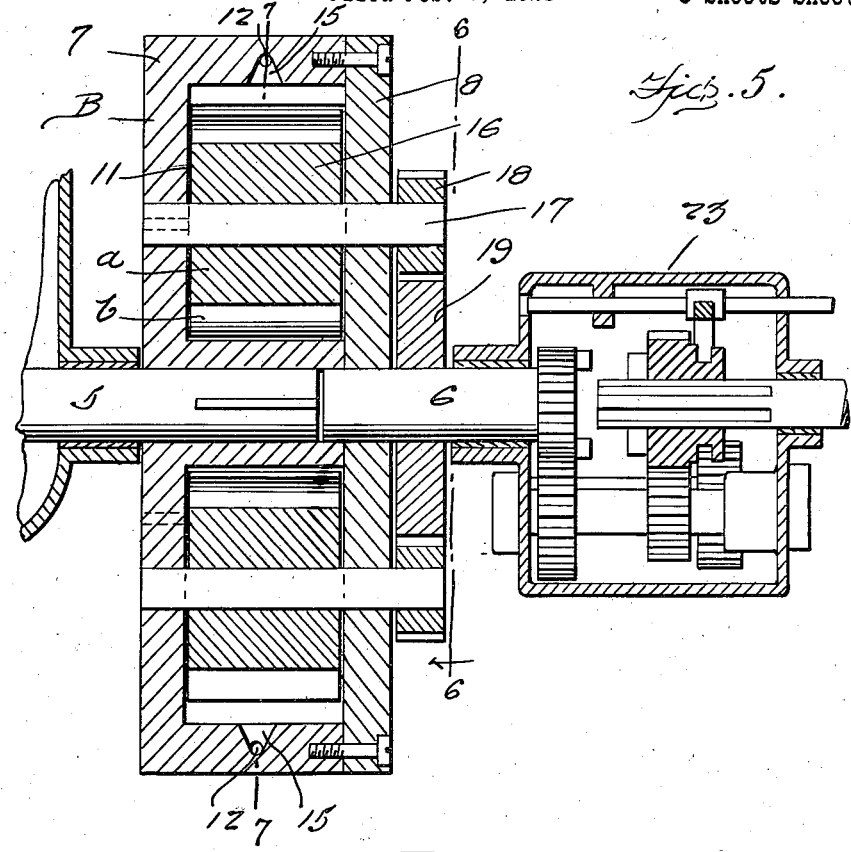
Figure 6:
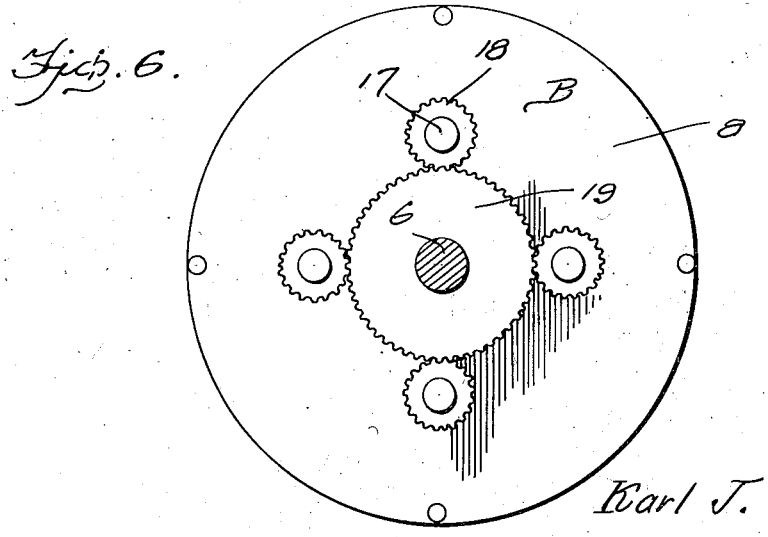

In the drawings:

Figure 1 is a side elevation of the transmission embodying the features of my invention, Figure 2 is a vertical transverse section taken substantially on the line 2—2 of Figure 1, Figure 3 is another transverse section taken substantially on the line 3—3 of Figure 1, Figure 4 is a detail section taken substantially on the line 4—4 of Figure 2, Figure 5 is a longitudinal vertical section through another embodiment of the invention, Figure 6 is a transverse section taken substantially on the line 6—6 of Figure 5, and Figure 7 is a transverse section taken substantially on the line 7—7 of Figure 5.

Referring to the drawings and particularly the embodiment of the invention shown in Figures 1 to 4 inclusive it will be seen that the numeral 50 denotes a drive shaft and the numeral 51 a driven shaft alined therewith. The letter L denotes generally a block keyed or otherwise rotatably mounted with the drive shaft 5. This block L in the present embodiment comprises a body portion 52 and a removable end plate 53.

The body portion 52 is constructed with a pair of radial cylinders 54 closed at their outer ends by plugs 55. These cylinders receive pistons 56 which are pressed inwardly by springs 57. The body 52 is further provided with a pair of compartments 58 between the cylinders. Conduits 59 are formed in the block extending from the outer end of the cylinders to the outer portions of the compartment, one compartment being connected with one cylinder. The compartments 58 are enlarged on one end as is indicated at a. The numerals 60 denote pocket wheels. Shafts 61 are rotatably mounted in the blocks one through the central portion of each compartment 58 and the wheels 60 are fixed thereto for rotation therewith. On the outer end of the shaft 61 there are fixed pinions 64 which mesh with a gear 65 mounted on the driven shaft 51 Breather openings 66 are provided at the inner ends of the cylinder. A quantity of liquid, such as mercury oil or the like is disposed in the cylinders and compartment capable of passing from the cylinders to the compartment and vice versa through the conduits.

Attention is now directed to another embodiment of the invention disclosed in Figures 5 and 7 inclusive and it will be seen that the numeral 5 denotes a drive shaft and the numeral 6 a driven shaft alined therewith. The letter B denotes generally a block keyed or otherwise rotatably mounted with the drive shaft 5. This block B in the present embodiment comprises a body portion 7 and a removable end plate 8. The body portion 7 is constructed with a plurality of radial cylinders 9 for receiving pistons 10. The body 7 is further provided with a plurality of compartments 11 one between each adjacent two cylinders 9 and disposed further in toward the center of the block than the cylinders 9. Conduits 12 are formed in the block extending from one cylinder to the outer end of another cylinder. Passages 14 connect the compartments 11 together, each passage 14 extends substantially tangentially from one compartment to the inner side of its center. The passage terminates in communication with the other portion of one of the next adjacent compartments and a pocket communicates the last mentioned end of the passage 14 as is shown at 15 with an intermediate portion of the adjacent conduit 12. The numerals 16 denote pocket wheels. It is to be understood that by pocket wheels I intend to comprehend any rotatable structure to which liquid in a compartment in which the structure is mounted would frictionally or otherwise impede the rotation of the structure. In the present instance each wheel 16 has a circular body $a'$ with curved blades $b$ radiating outwardly therefrom. Shafts 17 are rotatably mounted in the block B one through the center of each compartment 11 and the wheels 16 are fixed thereto for rotation therewith. On the outer ends of the shafts 17 there are fixed pinions 18 which mesh with a gear 19 mounted on the driven shaft 6.

Springs 20 urge the pistons 10 inwardly and the block is provided with breather openings 21 at the inner ends of the cylinders so as to permit free movement of the pistons inwardly and outwardly of the cylinders.

A quantity of liquid such as mercury, oil or the like is disposed in the cylinders and compartments capable of passing from the cylinders to the compartments and vice versa through the conduits, pockets and passages referred to above.

A suitable gear shifting mechanism 23 is operatively associated with the driven shaft 6 and affords a low gear and a reverse gear besides a direct drive connection. This gear shifting transmission 23 is not of the essence of the present invention.

Considering the shaft 5 rotating at a relatively low rate of speed so that the centrifugal force set up in the pistons 10 will not be sufficient to overcome the tension of the springs 20 it will be seen that the liquid will collect by centrifugal force in the outer portion of the cylinder 9, in the conduit 12, pockets 15 and outer portions or passages 14 and therefore offer no resistance to the rotation of the wheel 16 so that the pinions 18 will ride about the gear 19 without rotating said gear 19 and the driven shaft 6. Thus the transmission will be in what is known as neutral position. By speeding up the drive shaft 5 so that the centrifugal force of the piston overcome the tension of the springs it will be seen that the fluid will be forced out of the outer ends of the cylinder into the compartment and offer resistance to the rotation of the wheels 16 and impeding the free riding of the pinions 18 about the gear 19, so that the gear 19 will be rotated at a relatively slow rate of speed to the block B and the drive shaft 5. As the speed of the drive shaft 5 increases more fluid, of course will be forced into the compartment so that the rotation of the wheels will stop thus locking the pinions and the gear together so that the drive shaft and driven shaft rotate at the same rate of speed.

The block B may be used to take the place of the ordinary fly wheel of an engine and may be made comparatively small because of the construction and arrangement of the parts associated therewith. The neutral position is frictionless as the liquid mass remains outside the wheel compartment. In actual practice, in a speed of fifty revolutions above the neutral point, the liquid mass enters the pocket wheel compartment and produces such a strong resistance on the pocket wheels as to cause said wheels to stop in five to eight seconds, thereby the liquid mass is only exposed to friction a short time, preventing over-heating of the liquid mass and all other parts even after the process is repeated several times. It is preferable to use the mercury in oil for the liquid mass. In steep ascending I use the low gear of the transmission mechanism 23 as it lessens the speed of the car, but the power transmission embodying the features of my invention is at least three times as great. Using the low gear is the only way to attain and retain the highest number of revolutions of the motor and the highest centrifugal resistance. This is necessary to prevent the inner parts such as the pocket wheels from turning, thereby preventing the friction of the liquid mass with the pocket wheels which is the most important factor in this invention to be considered.

It is thought that the construction, operation and advantages of this invention will now be quite apparent to those skilled in this art without a more detailed description thereof.

The present embodiments of the invention have been disclosed in detail merely by way of examples since in actual practice they attain the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In combination, a drive shaft, a driven shaft alined with the drive shaft, a block rotatable with the drive shaft and having a radial cylinder and a compartment connected by a conduit therewith, a piston in the cylinder, a pocket wheel rotatable in the compartment, means urging the piston inwardly of the cylinder, a pinion operatively connected with the wheel, and a gear on the driven shaft meshing with the pinion.

2. In combination, a drive shaft, a driven shaft alined with the drive shaft, a block rotatable with the drive shaft and having a radial cylinder and a compartment connected by a conduit therewith, a piston in the cylinder, a shaft rotatable in the block and extending into the compartment, a pocket wheel on the third mentioned shaft in the compartment, means urging the piston inwardly of the cylinder, and gearing operatively connecting the third mentioned shaft with the driven shaft.

3. In combination, a drive shaft, a driven shaft alined with the drive shaft, a block rotatable with the drive shaft and having a radial cylinder and a compartment connected by a conduit therewith, a piston in the cylinder, a shaft rotatable in the block and extending into the compartment, a pocket wheel on the third mentioned shaft in the compartment, a pinion operatively connected with the third mentioned shaft, and a gear on the driven shaft meshing with the pinion.

4. In combination, a drive shaft, a driven shaft alined with the drive shaft, a block rotatable with the drive shaft and having a plurality of radial cylinders and a plurality of compartments therebetween connected by conduits with the cylinders, the cylinders being enlarged at one side so that a liquid mass may be disposed in the cylinders and conduits only, pistons in the cylinders, springs urging the pistons inwardly of the cylinders, pocket wheels rotatable in the compartments, whereby upon rotation of the drive shaft and block centrifugal force will overcome the means to force the pistons outwardly in the cylinders to force the mass in the compartments to impede the rotation of the pocket wheels, and means operatively connecting the pocket wheels with the driven shaft.

5. In combination, a drive shaft, a driven shaft alined with the drive shaft, a block rotatable with the drive shaft and having a plurality of radial cylinders and a plurality of compartments therebetween connected by conduits with the cylinders, the cylinders being enlarged to one side so that a liquid mass may be disposed in the cylinders and conduits only, pistons in the cylinders, springs urging the pistons inwardly of the cylinders, pocket wheels rotatable in the compartments, whereby upon rotation of the drive shaft and block centrifugal force will overcome the means to force the pistons outwardly in the cylinders to force the mass in the compartments to impede the rotation of the pocket wheels, pinions operatively connected with the wheels, and a gear on the driven shaft meshing with the pinions.

6. In combination, a drive shaft, a driven shaft alined with the drive shaft, a block rotatable with the drive shaft and having a radial cylinder and a compartment connected by a conduit with the cylinder, a piston in the cylinder, a pocket wheel rotatable in the compartment, said cylinder and conduit being adapted to wholly contain a liquid mass which may be forced into the compartment by the outward movement of the piston caused by centrifugal force to set up impedance to the rotation of the wheel, means normally urging the piston inwardly of the cylinder, a pinion operatively connected with the wheel, and a gear on the driven shaft meshing with the pinion.

7. In combination, a drive shaft, a driven shaft alined with the drive shaft, a block rotatable with the drive shaft and having a radial cylinder and a compartment connected by a conduit with the cylinder, a piston in the cylinder, a pocket wheel rotatable in the compartment, said cylinder and conduit being adapted to wholly contain a liquid mass which may be forced into the compartment by the outward movement of the piston caused by centrifugal force to set up impedance to the rotation of the wheel, means normally urging the piston inwardly of the cylinder, and gearing operatively connecting the wheel with the driven shaft.

8. In combination, a drive shaft, a driven shaft alined with the drive shaft, a block rotatable with the drive shaft and having a radial cylinder and a compartment connected by a conduit with the cylinder, a piston in the cylinder, a pocket wheel rotatable in the compartment, spring means urging the piston inwardly of the cylinder, said cylinder and conduit being adapted to wholly contain the mass of liquid which may be forced by the outward movement of the piston in the cylinder by centrifugal force upon the rotation of the block into the compartment to impede the rotation of the wheel, a shaft connected with the wheel and terminating outside of the block, and gearing between the last mentioned shaft and the driven shaft.

9. In combination, a drive shaft, a driven shaft alined with the drive shaft, a block rotatable with the drive shaft and having a radial cylinder and a compartment connected by a conduit with the cylinder, a piston in the cylinder, a pocket wheel rotatable in the compartment, spring means urging the piston inwardly of the cylinder, said cylinder and conduit being adapted to wholly contain the mass of liquid which may be forced by the outward movement of the piston in the cylinder by centrifugal force upon the rotation of the block into the compartment to impede the rotation of the wheel, a shaft connected with the wheel and terminating outside of the block, a pinion on the outer end of the last mentioned shaft, and a gear on the driven shaft meshing with the pinion.

In testimony whereof I affix my signature.

KARL JOSEF STRIGL.